US010292249B2

(12) United States Patent
Tsukizawa et al.

(10) Patent No.: US 10,292,249 B2
(45) Date of Patent: May 14, 2019

(54) ESD PROTECTION DEVICE

(71) Applicant: Murata Manufacturing Co., Ltd., Nagaokakyo-shi, Kyoto-fu (JP)

(72) Inventors: Takayuki Tsukizawa, Nagaokakyo (JP); Takeshi Miki, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/834,149

(22) Filed: Dec. 7, 2017

(65) Prior Publication Data

US 2018/0103532 A1 Apr. 12, 2018

Related U.S. Application Data

(63) Continuation of application No. PCT/JP2016/068132, filed on Jun. 17, 2016.

(30) Foreign Application Priority Data

Jul. 22, 2015 (JP) ................................ 2015-145105

(51) Int. Cl.

*H02H 9/00* (2006.01)
*H05F 3/04* (2006.01)
*H01T 1/20* (2006.01)
*H01T 2/02* (2006.01)
*H01T 4/12* (2006.01)
*H01T 4/10* (2006.01)

(52) U.S. Cl.

CPC ................ *H05F 3/04* (2013.01); *H01T 1/20* (2013.01); *H01T 2/02* (2013.01); *H01T 4/12* (2013.01); *H01T 4/10* (2013.01)

(58) Field of Classification Search

None

See application file for complete search history.

(56) References Cited

U.S. PATENT DOCUMENTS

2013/0201585 A1 8/2013 Ikeda et al.
2017/0033097 A1* 2/2017 Sumi ......................... H01T 4/10

FOREIGN PATENT DOCUMENTS

JP 2001-076840 A 3/2001
JP 2010-129320 A 6/2010
WO 2011/09633 A1 8/2011
WO 2015/087394 A1 6/2015

OTHER PUBLICATIONS

Official Communication issued in International Patent Application No. PCT/JP2016/068132, dated Sep. 20, 2016.

* cited by examiner

*Primary Examiner* — Stephen W Jackson
(74) *Attorney, Agent, or Firm* — Keating & Bennett, LLP

(57) ABSTRACT

An ESD protection device includes a base body, first and second discharge electrodes provided in the base body and facing each other in a lamination direction, and a discharge auxiliary electrode that is provided between the first and second discharge electrodes and electrically couples the first and second discharge electrodes. The base body includes a cavity provided around at least a portion of an outer surface of the discharge auxiliary electrode and the cavity exposes the first discharge electrode, the second discharge electrode, and a region that is included in the outer surface of the discharge auxiliary electrode and is present between the first discharge electrode and the second discharge electrode.

17 Claims, 10 Drawing Sheets

ESD PROTECTION DEVICE

CROSS REFERENCE TO RELATED APPLICATIONS

This application claims the benefit of priority to Japanese Patent Application No. 2015-145105 filed on Jul. 22, 2015 and is a Continuation Application of PCT Application No. PCT/JP2016/068132 filed on Jun 17, 2016. The entire contents of each application are hereby incorporated herein by reference.

BACKGROUND OF THE INVENTION

1. Field of the Invention

The present invention relates to electro-static discharge (ESD) protection devices.

2. Description of the Related Art

An example of a conventional ESD protection device is disclosed in International Publication No. WO2011/096335. The ESD protection device includes a base body, a first discharge electrode and a second discharge electrode that are provided in the base body and face each other in a lamination direction, and a discharge auxiliary electrode that is provided between the first discharge electrode and the second discharge electrode and electrically couples the first discharge electrode and the second discharge electrode.

The present inventor has discovered that the conventional ESD protection device is problematic in its low resistance to continuous application of ESD by actually using the conventional ESD protection device. The present inventor has reviewed this phenomenon diligently and determined the causes described below.

When ESD is applied, only internal discharge occurs in a discharge auxiliary electrode and energy is concentrated. Thus, thermal shock is concentrated in the discharge auxiliary electrode and the discharge auxiliary electrode deteriorates, and dielectric strength at the time of continuous application of ESD decreases.

SUMMARY OF THE INVENTION

Preferred embodiments of the present invention provide ESD protection devices with increased dielectric strength at the time of continuous application of ESD.

An ESD protection device according to a preferred embodiment of the present invention includes a base body, a first discharge electrode and a second discharge electrode that are provided in the base body and face each other in a lamination direction, and a discharge auxiliary electrode that is provided between the first discharge electrode and the second discharge electrode and electrically couples the first discharge electrode and the second discharge electrode, the base body including a cavity provided around at least a portion of an outer surface of the discharge auxiliary electrode, the cavity exposing the first discharge electrode, the second discharge electrode, and a region that is included in the outer surface of the discharge auxiliary electrode and is present between the first discharge electrode and the second discharge electrode.

In an ESD protection device according to a preferred embodiment of the present invention, the base body includes a cavity provided around at least a portion of an outer surface of the discharge auxiliary electrode and the cavity exposes the first discharge electrode, the second discharge electrode, and a region that is included in the outer surface of the discharge auxiliary electrode and is present between the first discharge electrode and the second discharge electrode. Thus, since the discharge auxiliary electrode, the first discharge electrode, and the second discharge electrode are exposed to the cavity, not only internal discharge of the discharge auxiliary electrode but creepage discharge of the discharge auxiliary electrode also occurs at the application of ESD and concentration of energy is able to be loosened. In addition, since the discharge auxiliary electrode is exposed to the cavity, heat of the discharge auxiliary electrode is able to be released to the cavity. As a result, dielectric strength at the time of continuous application of ESD is able to be increased.

Further, in an ESD protection device according to a preferred embodiment of the present invention, a size of the cavity on a side of the first discharge electrode is smaller than a size of the cavity in a middle portion between the first discharge electrode and the second discharge electrode.

According to a preferred embodiment of the present invention, the size of the cavity on the side of the first discharge electrode is smaller than the size of the cavity in the middle portion between the first discharge electrode and the second discharge electrode. Thus, when the first discharge electrode is coupled to a primary side (the input side of static electricity) and the second discharge electrode is coupled to a secondary side (the output side of static electricity), the cavity is narrower on the side of the first discharge electrode and accordingly, electric fields at the application of ESD are able to be easily concentrated. Consequently, creepage discharge of the discharge auxiliary electrode is able to occur easily and dielectric strength at the time of continuous application of ESD is able to be increased without lowering ESD protection performance.

Further, in an ESD protection device according to a preferred embodiment of the present invention, in a cross section along the lamination direction, a length of the cavity in a direction orthogonal or substantially orthogonal to the lamination direction in a position of the first discharge electrode is shorter than a length of the cavity in a direction orthogonal or substantially orthogonal to the lamination direction in a middle position between the first discharge electrode and the second discharge electrode.

According to a preferred embodiment of the present invention, the length of the cavity in the position of the first discharge electrode is shorter than the length of the cavity in the middle position between the first discharge electrode and the second discharge electrode. Thus, since the cavity is narrower on the side of the first discharge electrode, ESD responsiveness is able to be increased.

Further, in an ESD protection device according to a preferred embodiment of the present invention, in a cross section along the lamination direction, an inner surface of the base body defining the cavity includes an inclined shape that becomes wider from the first discharge electrode toward the second discharge electrode and the cavity increases in size from the first discharge electrode toward the second discharge electrode.

According to a preferred embodiment of the present invention, the inner surface of the base body defining the cavity includes an inclined shape that becomes wider from the first discharge electrode toward the second discharge electrode and the cavity increases in size from the first discharge electrode toward the second discharge electrode. Thus, since the cavity is narrower on the side of the first discharge electrode, ESD responsiveness is able to be increased. In addition, the cavity is able to be increased in size, heat dispersion characteristics of the discharge auxiliary electrode is able to be enhanced, and dielectric strength at the time of continuous application of ESD is able to be increased.

Further, in an ESD protection device according to a preferred embodiment of the present invention, in a cross section along the lamination direction, an outer surface of the discharge auxiliary electrode defining the cavity includes an inclined shape that becomes narrower from the first discharge electrode toward the second discharge electrode and the cavity increases in size from the first discharge electrode toward the second discharge electrode.

According to a preferred embodiment of the present invention, the outer surface of the discharge auxiliary electrode defining the cavity includes an inclined shape that becomes narrower from the first discharge electrode toward the second discharge electrode and the cavity increases in size from the first discharge electrode toward the second discharge electrode. Thus, since the cavity is narrower on the side of the first discharge electrode, ESD responsiveness is able to be increased. Moreover, the inner surface of the base body, which defines the cavity, is able to extend vertically along the lamination direction and the cavity is able to be further increased in size. Accordingly, heat dispersion characteristics of the discharge auxiliary electrode are able to be enhanced and dielectric strength at the time of continuous application of ESD is able to be increased.

Further, in an ESD protection device according to a preferred embodiment of the present invention, in a cross section along the lamination direction, an inner surface of the base body defining the cavity includes a depressed shape that becomes wider from each of the first discharge electrode and the second discharge electrode toward a middle portion between the first discharge electrode and the second discharge electrode and the cavity increases in size from each of the first discharge electrode and the second discharge electrode toward the middle portion between the first discharge electrode and the second discharge electrode.

According to a preferred embodiment present invention, the inner surface of the base body defining the cavity includes a depressed shape that becomes wider from each of the first discharge electrode and the second discharge electrode toward the middle portion between the first discharge electrode and the second discharge electrode and the cavity increases in size from each of the first discharge electrode and the second discharge electrode toward the middle portion between the first discharge electrode and the second discharge electrode. Thus, since the cavity is narrower on the side of the first discharge electrode, ESD responsiveness is able to be increased. Further, the cavity is able to be increased in size without increasing the size of the cavity on the side of the first discharge electrode or on the side of the second discharge electrode.

Since in an ESD protection device according to a preferred embodiment of the present invention, the base body includes a cavity provided around at least a portion of an outer surface of the discharge auxiliary electrode and the cavity exposes the first discharge electrode, the second discharge electrode, and a region that is included in the outer surface of the discharge auxiliary electrode and is present between the first discharge electrode and the second discharge electrode, dielectric strength at the time of continuous application of ESD is able to be increased.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
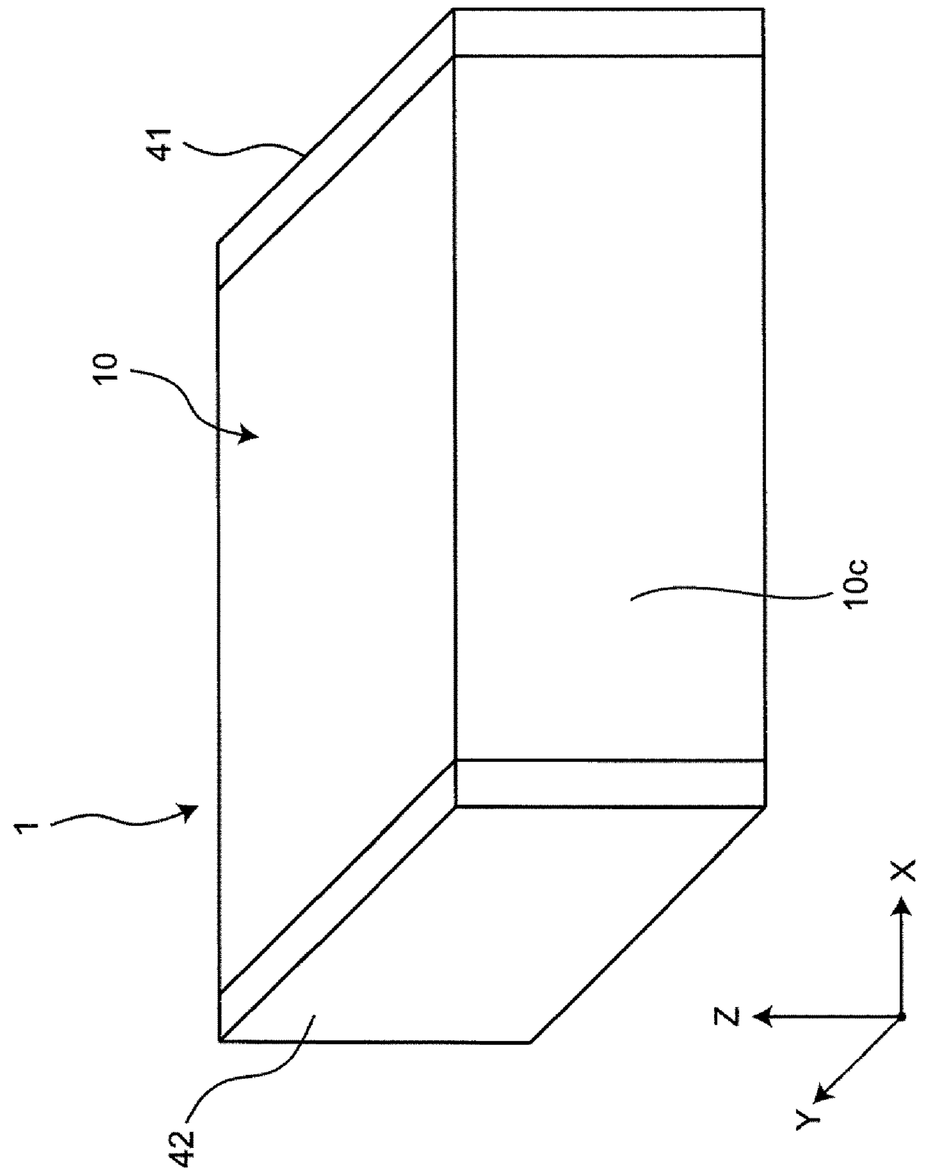
FIG. 1 is a perspective view that illustrates an ESD protection device according to a first preferred embodiment of the present invention.

Preferred embodiments of the present invention are described in detail below with reference to the drawings.

It is to be noted that the following preferred embodiments represent examples of the present invention for merely illustrative purposes, and that the present invention is not limited to matters disclosed in the following preferred embodiments. The matters disclosed in the different preferred embodiments are able to be combined with each other in practical applications, and modified preferred embodiments in those cases are also included in the scope of the present invention. The drawings serve to assist understanding of the preferred embodiments, and they are not always exactly drawn in a strict sense. In some cases, for instance, dimension ratios between constituent elements themselves or dimension ratios of distances between elements or features, which are shown in the drawings, are not in match with the dimension ratios described in the Description.

Furthermore, some of the elements or features, which are explained in the Description, are omitted from the drawings, or they are shown in a reduced number on a case-by-case basis.

First Preferred Embodiment

Figure 2A:
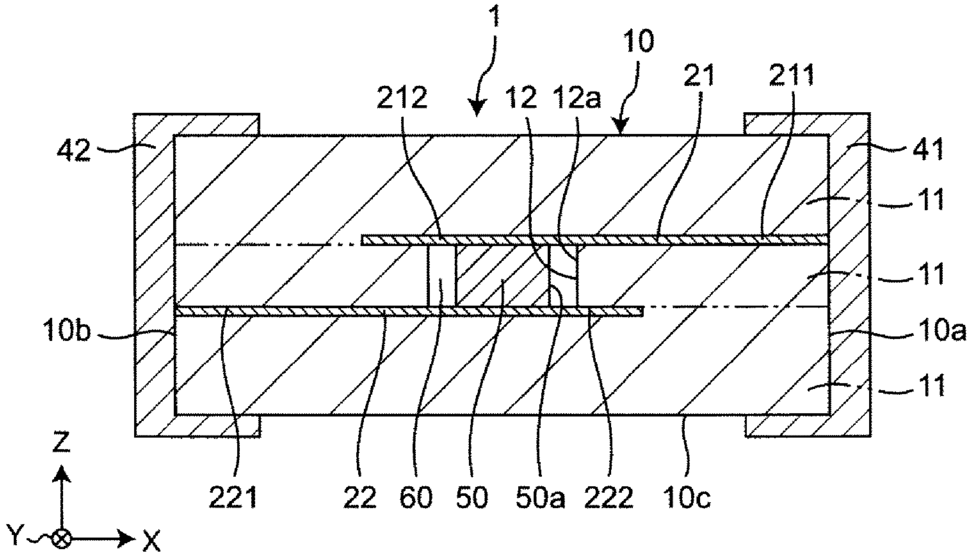
FIG. 2A is an XZ cross-sectional view of FIG. 1.
Figure 2B:
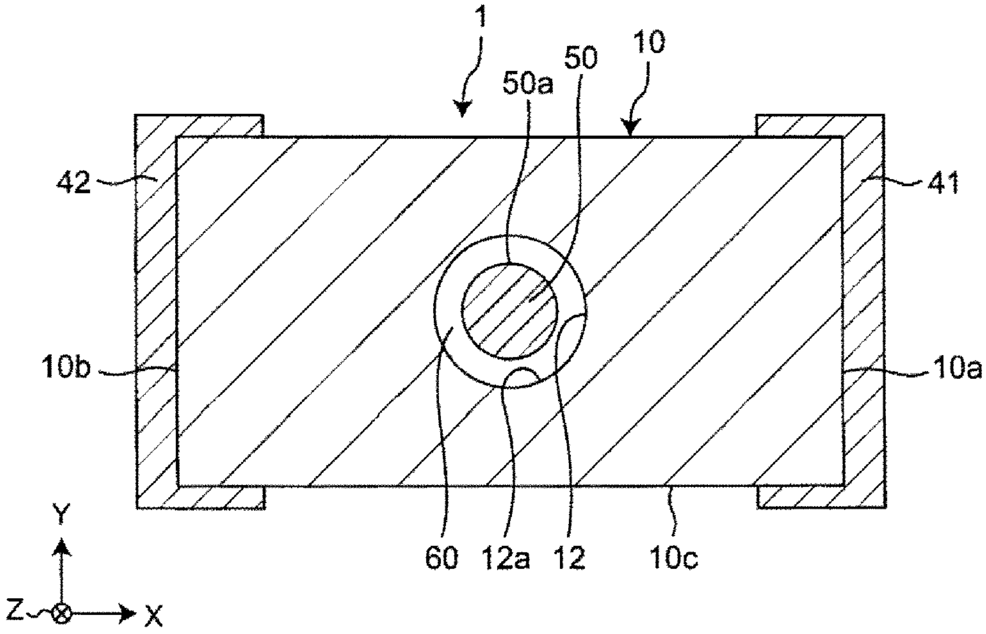
FIG. 2B is an XY cross-sectional view of FIG. 1.

FIG. 1 is a perspective view that illustrates an ESD protection device according to a first preferred embodiment of the present invention. FIG. 2A is an XZ cross-sectional view of FIG. 1. FIG. 2B is an XY cross-sectional view of FIG. 1. As illustrated in FIGS. 1, 2A, and 2B, an electrostatic discharge (ESD) protection device 1 includes a base body 10, a first discharge electrode 21, a second discharge electrode 22, and a discharge auxiliary electrode 50, which are provided in the base body 10, and a first outer electrode 41 and a second outer electrode 42, which are provided on an outer surface of the base body 10.

The base body 10 includes a rectangular parallelepiped or a substantially rectangular parallelepiped shape with a length, a width, and a height. The length direction of the base body 10 is referred to as the X direction, the width direction of the base body 10 is referred to as the Y direction, and the height direction of the base body 10 is referred to as the Z direction. The outer surface of the base body 10 includes a first end surface 10*a*, a second end surface 10*b* positioned opposite the first end surface 10*a*, and a peripheral surface 10*c* positioned between the first end surface 10*a* and the second end surface 10*b*. The first end surface 10*a* and the second end surface 10*b* are positioned in the X direction.

The base body 10 is structured by laminating a plurality of ceramic layers 11. The plurality of ceramic layers 11 are laminated in the Z direction. The ceramic layers include, for example, low temperature co-fired ceramics (LTCC) that contain Ba, Al, and Si as main ingredients. The ceramic layer may contain at least one of an alkali metal ingredient and a boron ingredient or may contain a glass ingredient.

The first discharge electrode 21 and the second discharge electrode 22 face each other in the lamination direction of the plurality of ceramic layers 11 (the Z direction). The first discharge electrode 21 and the second discharge electrode 22 are provided in the lamination direction and spaced away from each other by a predetermined distance. The first discharge electrode is coupled to the first outer electrode 41 and the second discharge electrode 22 is coupled to the second outer electrode 42.

The first discharge electrode 21 and the second discharge electrode 22 each include a plate shape that extends in the X direction. The first discharge electrode 21 and the second discharge electrode 22 include a suitable material, for example, Cu, Ag, Pd, Pt, Al, Ni, W, or an alloy that contains at least one thereof.

A first end portion 211 in the longitudinal direction of the first discharge electrode 21 is exposed from the first end surface 10*a* of the base body 10. A second end portion 212 in the longitudinal direction of the first discharge electrode 21 is positioned in the base body 10. A first end portion 221 in the longitudinal direction of the second discharge electrode 22 is exposed from the second end surface 10*b* of the base body 10. A second end portion 222 in the longitudinal direction of the second discharge electrode 22 is positioned in the base body 10. The second end portion 212 of the first discharge electrode 21 and the second end portion 222 of the second discharge electrode 22 face each other and are spaced away from each other by a predetermined distance.

The discharge auxiliary electrode 50 is provided between the first discharge electrode 21 and the second discharge electrode 22 and electrically couples the first discharge electrode 21 and the second discharge electrode 22. The discharge auxiliary electrode 50 couples the second end portion 212 of the first discharge electrode 21 and the second end portion 222 of the second discharge electrode 22. The discharge auxiliary electrode 50 is located in a via hole 12, which penetrates in the lamination direction between the first discharge electrode 21 and the second discharge electrode 22.

The discharge auxiliary electrode 50 includes, for example, a mixture of a conducting material and an insulating material. Examples of the conducting material include conductor powder. The conducting material may be for example, Cu, Ag, Pd, Pt, Al, Ni, W, or a combination thereof, or may be a material with conductivity that is lower than that of a metallic material, for example, a semiconductor material such as SiC powder or a resistive material. The insulating material may be for example, an oxide, such as $Al_2O_3$, $SiO_2$, $ZrO_2$, or $TiO_2$, a nitride, such as $Si_3N_4$ or AlN, mixed calcination powder of materials of a ceramic base material, a vitreous substance, or a combination thereof.

The base body 10 includes a cavity 60 provided all around an outer surface 50*a* of the discharge auxiliary electrode 50. The cavity 60 exposes the second end portion 212 of the first discharge electrode 21, the second end portion 222 of the second discharge electrode 22, and a region that is included in the outer surface 50*a* of the discharge auxiliary electrode 50 and is present between the first discharge electrode 21 and the second discharge electrode 22.

The cavity 60 includes a space surrounded by an end surface of the first discharge electrode 21, an end surface of the second discharge electrode 22, an inner surface 12*a* of the via hole 12 of the base body 10, and the outer surface 50*a* of the discharge auxiliary electrode 50. The inner surface 12*a* of the via hole 12 of the base body 10 and the outer surface 50*a* of the discharge auxiliary electrode 50 each include a rounded shape when viewed in the lamination direction (the Z direction). That is, the cavity 60 includes a circular or a substantially circular shape when viewed in the lamination direction.

In a cross section along the lamination direction (an XZ cross section), the inner surface 12*a* of the base body 10 extends vertically along the lamination direction (the Z direction). The outer surface 50*a* of the discharge auxiliary electrode 50 extends vertically along the lamination direction (the Z direction).

Operations of the ESD protection device 1 are described below.

The ESD protection device 1 is used with an electronic apparatus, for example, and discharges static electricity that occurs in the electronic apparatus and inhibits breakdown of the electronic apparatus caused by the static electricity. Specifically, when the first outer electrode 41 is coupled to a terminal of the electronic apparatus (the primary side) and the second outer electrode 42 is coupled to the ground (the secondary side), the static electricity of the electronic apparatus is propagated from the first outer electrode 41 and the first discharge electrode 21 to the second discharge electrode 22 and the second outer electrode 42 through the discharge auxiliary electrode 50. The primary side is the input side of static electricity and the secondary side is the output side of static electricity. The discharge of static electricity from the first discharge electrode 21 to the second discharge electrode 22 includes internal discharge of current that flows in the discharge auxiliary electrode 50 and creepage discharge of current that flows on the outer surface 50*a* of the discharge auxiliary electrode 50.

In the above-described ESD protection device, the base body 10 includes the cavity 60 that is provided around the outer surface 50*a* of the discharge auxiliary electrode 50 and exposes the first discharge electrode 21, the second discharge electrode 22, and a region included in the outer surface 50*a* of the discharge auxiliary electrode 50 and present between the first discharge electrode 21 and the second discharge electrode 22. Thus, since the discharge auxiliary electrode 50, the first discharge electrode 21, and the second discharge electrode 22 are exposed to the cavity 60, not only internal discharge of the discharge auxiliary electrode but creepage discharge of the discharge auxiliary electrode 50 also occurs at the time of application of ESD and concentration of energy is able to be loosened. In addition, since the discharge auxiliary electrode 50 is exposed to the cavity 60, heat of the discharge auxiliary electrode 50 is able to be released to the cavity 60. As a result, dielectric strength at the time of continuous application of ESD is able to be increased.

Second Preferred Embodiment

Figure 3:
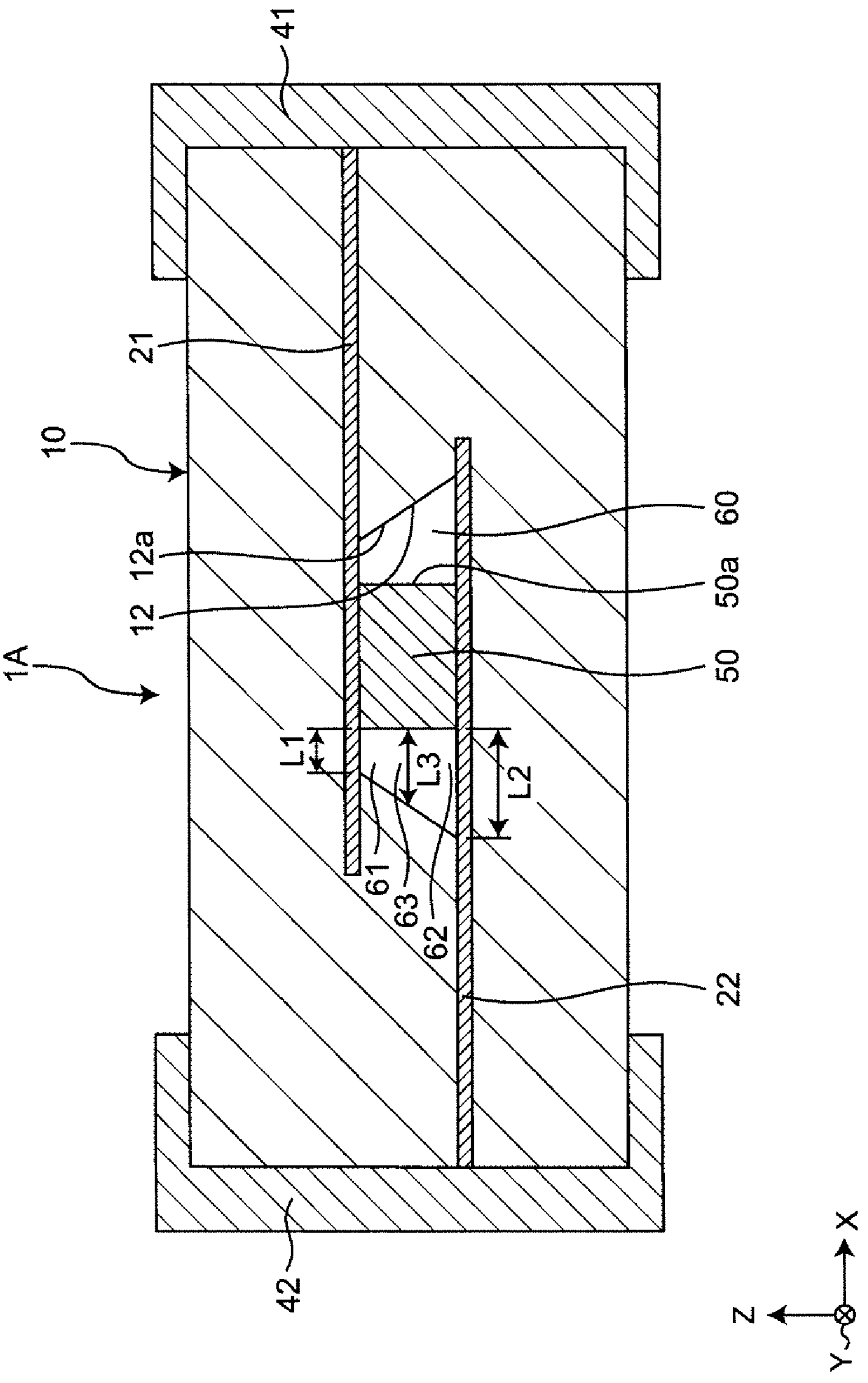
FIG. 3 is a cross-sectional view that illustrates an ESD protection device according to a second preferred embodiment of the present invention.

FIG. 3 is a cross-sectional view that illustrates an ESD protection device according to a second preferred embodiment of the present invention. The second preferred embodiment is different from the first preferred embodiment in the shape of the cavity. The difference in the structure is described below. In the second preferred embodiment, reference signs identical to those in the first preferred embodiment indicate the same or similar structures as those in the first preferred embodiment and thus, the descriptions thereof are omitted.

As illustrated in FIG. 3, in an ESD protection device 1A, a cavity 60 includes a first portion 61 on the side of a first discharge electrode 21, a second portion 62 on the side of a second discharge electrode 22, and a middle portion 63 in the middle between the first discharge electrode 21 and the second discharge electrode 22. The first portion 61 is smaller in size than the middle portion 63. The middle portion 63 is smaller in size than the second portion 62.

Specifically, in a cross section along the lamination direction (an XZ cross section), a first length L1 of the first portion 61 in the X direction in the position of the first discharge electrode 21 is shorter than a middle-portion length L3 of the middle portion 63 in the X direction in a middle position between the first discharge electrode 21 and the second discharge electrode 22. The middle-portion length L3 of the middle portion 63 in the X direction in the middle position between the first discharge electrode 21 and the second discharge electrode 22 is shorter than a second length L2 of the second portion 62 in the X direction in the position of the second discharge electrode 22.

In the cross section along the lamination direction (the XZ cross section), an inner surface 12*a* of a via hole 12 of a base body 10, which defines the cavity 60, includes an inclined shape that becomes wider from the first discharge electrode 21 toward the second discharge electrode 22 and the cavity 60 increases in size from the first discharge electrode 21 toward the second discharge electrode 22. The inner surface 12*a* is referred to as an inversely tapered surface. Although the inner surface 12*a* of the base body 10 is straight, the inner surface 12*a* may be curved. An outer surface 50*a* of the discharge auxiliary electrode 50, which defines the cavity 60, extends vertically along the lamination direction (the Z direction). Although the outer surface 50*a* of the discharge auxiliary electrode 50 is straight, the outer surface 50*a* may be curved.

Thus, the size of the cavity 60 in the first portion 61 is smaller than the size of the cavity 60 in the middle portion 63. Accordingly, when the first discharge electrode 21 is coupled to the primary side (the input side of static electricity) and the second discharge electrode 22 is coupled to the secondary side (the output side of static electricity), the cavity 60 is narrower on the side of the first discharge electrode 21 and thus, electric fields at the time of application of ESD are able to be concentrated easily. As a result, creepage discharge of the discharge auxiliary electrode 50 is able to easily occur and dielectric strength at the time of continuous application of ESD is able to be increased without lowering ESD protection performance.

The length of the cavity 60 in the position of the first discharge electrode 21 is shorter than the length of the cavity 60 in the middle position between the first discharge electrode 21 and the second discharge electrode 22. Thus, since the cavity 60 is narrower on the side of the first discharge electrode 21, ESD responsiveness is able to be increased.

The inner surface 12*a* of the via hole 12 of the base body 10, which defines the cavity 60, includes an inclined shape that becomes wider from the first discharge electrode 21 toward the second discharge electrode 22 and the cavity 60 increases in size from the first discharge electrode 21 toward the second discharge electrode 22. Thus, since the cavity 60 is narrower on the side of the first discharge electrode 21, ESD responsiveness is able to be increased. In addition, the cavity 60 is able to be increased in size, heat dispersion characteristics of the discharge auxiliary electrode 50 are able to be enhanced, and dielectric strength at the time of continuous application of ESD is able to be increased.

Third Preferred Embodiment

Figure 4:
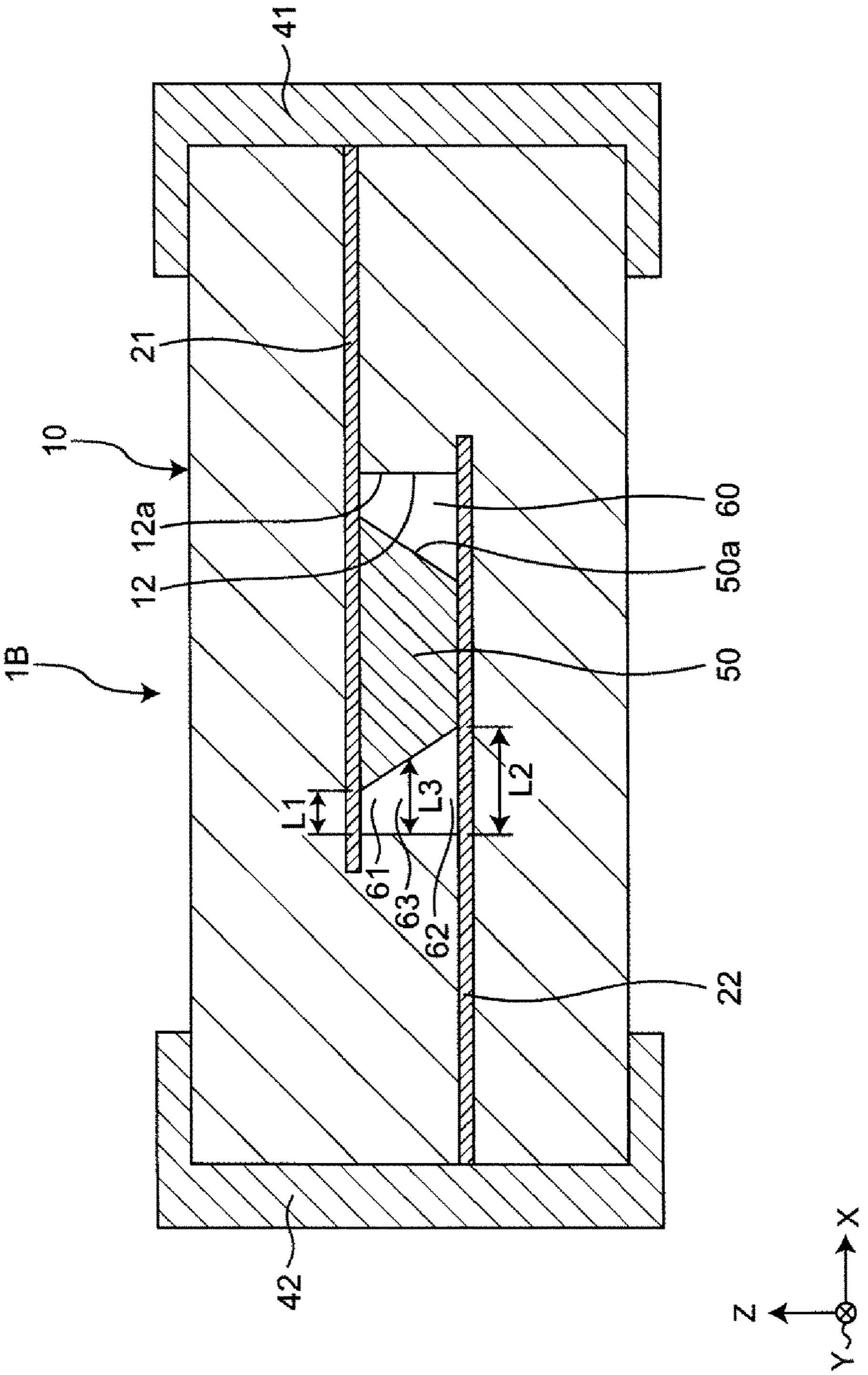
FIG. 4 is a cross-sectional view that illustrates an ESD protection device according to a third preferred embodiment of the present invention.

FIG. 4 is a cross-sectional view that illustrates an ESD protection device according to a third preferred embodiment of the present invention. The third preferred embodiment is different from the second preferred embodiment in the shape of the cavity. The difference in the structure is described below. In the third preferred embodiment, reference signs identical to those in the second preferred embodiment indicate the same or similar structures as those in the second preferred embodiment and thus, the descriptions thereof are omitted.

As illustrated in FIG. 4, in a cross section of the ESD protection device 1B along the lamination direction (an XZ cross section), an outer surface 50*a* of a discharge auxiliary electrode 50, which defines a cavity 60, includes an inclined shape that becomes narrower from a first discharge electrode 21 toward a second discharge electrode 22 and the cavity 60 increases in size from the first discharge electrode 21 toward the second discharge electrode 22. The outer surface 50*a* is referred to as a tapered surface. An inner surface 12*a* of a via hole 12 of a base body 10, which defines the cavity 60, is located vertically along the lamination direction (the Z direction).

Thus, since the outer surface 50*a* of the discharge auxiliary electrode 50, which defines the cavity 60, includes an inclined shape, the cavity 60 is narrower on the side the first discharge electrode 21 and ESD responsiveness is able to be increased. In addition, the inner surface 12*a* of the via hole 12 of the base body 10, which defines the cavity 60, is able to be located vertically along the lamination direction and the cavity 60 is able to be further increased in size. That is, when the maximum outside diameter of the inner surface 12*a* of the base body 10 is the same as or similar to that in the second preferred embodiment, the cavity 60 is able to be larger in size than that in the second preferred embodiment. Accordingly, heat dispersion characteristics of the discharge auxiliary electrode 50 are able to be enhanced and dielectric strength at the time of continuous application of ESD is able to be increased.

Fourth Preferred Embodiment

Figure 5:
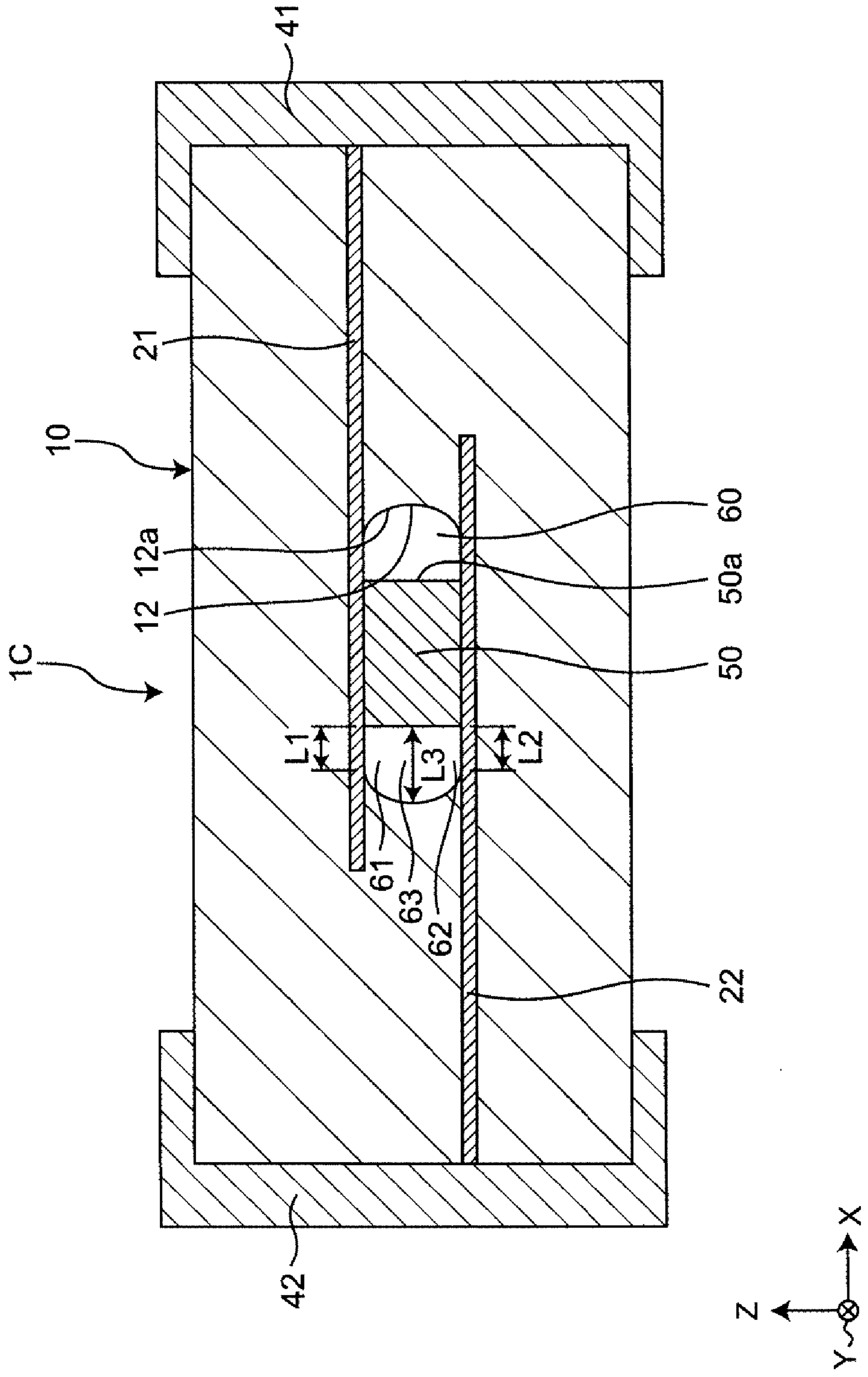
FIG. 5 is a cross-sectional view that illustrates an ESD protection device according to a fourth preferred embodiment of the present invention.

FIG. 5 is a cross-sectional view that illustrates an ESD protection device according to a fourth preferred embodiment of the present invention. The fourth preferred embodiment is different from the second preferred embodiment in the shape of the cavity. The difference in the structure is described below. In the fourth preferred embodiment, reference signs identical to those in the second preferred embodiment indicate the same or similar structures as those in the second preferred embodiment and thus, the descriptions thereof are omitted.

As illustrated in FIG. 5, in a cross section of an ESD protection device 1C along the lamination direction (an XZ cross section), an inner surface 12*a* of a via hole 12 of a base body 10, which defines a cavity 60, includes a depressed shape that becomes wider from each of a first discharge electrode 21 and a second discharge electrode 22 toward a middle portion between the first discharge electrode 21 and the second discharge electrode 22 and the cavity 60 increases in size from each of the first discharge electrode 21 and the second discharge electrode 22 toward the middle portion between the first discharge electrode 21 and the second discharge electrode 22. The inner surface 12*a* is referred to as a domical surface. Although the inner surface 12*a* of the base body 10 is curved, the inner surface 12*a* may be straight.

That is, a middle portion 63 is larger in size than a first portion 61 and a second portion 62. The first portion 61 and the second portion 62 may be the same or different in size.

Thus, since the inner surface 12*a* of the via hole 12 of the base body 10, which defines the cavity 60, includes a depressed shape, the cavity 60 is narrower on the side of the first discharge electrode 21 and ESD responsiveness is able to be increased. Further, the cavity 60 is able to be increased in size without increasing the sizes of the cavity 60 on the side of the first discharge electrode 21 and the side of the second discharge electrode 22.

The present invention is not limited to the above-described preferred embodiments and may be changed in design within the scope not departing from the gist of the present invention. For example, the features of the first to fourth preferred embodiments may be combined variously.

Although in each of the above-described preferred embodiments, the first discharge electrode and the second discharge electrode are provided in the base body, at least one of the first discharge electrode and the second discharge electrode may be provided outside the base body.

Although in each of the above-described preferred embodiments, the first discharge electrode is coupled to the primary side and the second discharge electrode is coupled to the secondary side, the first discharge electrode may be coupled to the secondary side and the second discharge electrode may be coupled to the primary side.

Although in each of the above-described preferred embodiments, the cavity is provided all around the outer surface of the discharge auxiliary electrode, the cavity may be provided around at least a portion of the outer surface of the discharge auxiliary electrode. Although the cavity is provided in a circular or a substantially circular shape all around the outer surface of the discharge auxiliary electrode, a plurality of cavities may be provided around the outer surface of the discharge auxiliary electrode by being intermittently separated.

Although being vertical surfaces along the lamination direction in the first preferred embodiment, the inner surface of the base body and the outer surface of the discharge auxiliary electrode may each be an inclined surface.

Although in the cavity in each of the second and third preferred embodiments, the first portion is smaller than the second portion, the second portion may be smaller than the first portion. Further, the inner surface of the base body and the outer surface of the discharge auxiliary electrode may each be a vertical surface or an inclined surface.

FIRST IMPLEMENTATION EXAMPLE

Described below is an implementation example of manufacturing methods according to the above-described first to third preferred embodiments.

(1) Preparation of Ceramic Sheets

A ceramic material as a material of a ceramic sheet is a material mainly including Ba, Al, and Si (a BAS material). The original materials are compounded and mixed into a predetermined composition and calcined at 800° C. to 1000° C. The resultant calcination powder is pulverized with a zirconia ball mill for 12 hours to provide ceramic powder. An organic solvent, for example, toluene or equinene, is added to the ceramic powder and mixed. Further, a binder and a plasticizer are added and mixed to provide a slurry. The slurry is molded by a doctor blade method to provide ceramic sheets with a thickness of about 10 μm and a thickness of about 50 μm, for example.

(2) Preparation of Discharge Electrodes

An electrode paste that forms discharge electrodes is prepared by compounding about 80 wt % of Cu powder with an average particle diameter of about 2 μm and about 20 wt % of an organic vehicle prepared by dissolving ethyl cellulose in terpineol and then agitating and mix the resultant with three rolls.

(3) Preparation of a Discharge Auxiliary Electrode

A mixture paste that forms a discharge auxiliary electrode is prepared by compounding core/shell powder of $Cu/Al_2O_3$ with an average particle diameter of about 2 μm and powder of $Al_2O_3$ with an average particle diameter of about 0.5 μm at a ratio of about 80/20 vol % and adding binder resin and a solvent, and then agitating and mixing the resultant with three rolls. In the mixture paste, the binder resin, which includes ethyl cellulose, for example, and the solvent is about 20 wt % while the Cu powder and the $Al_2O_3$ powder is about 80 wt %.

(4) Preparation of a Paste for a Cavity

A resin bead paste for a layer to be removed by fire is prepared by compounding about 38 wt % of crosslinked acrylic resin bead with an average particle diameter of about 1 μm and about 62 wt % of an organic vehicle prepared by dissolving ethyl cellulose in dihydroterpinyl acetate and mixing the resultant with three rolls. As the paste material, resin that decomposes in firing to be removed by fire is included and other examples include PET and polypropylene.

(5) Formation of a Via Hole

A via hole with a diameter of about 200 μm is formed in a ceramic sheet by machining or laser processing. When machining is performed, a via hole with an inner surface that is the cylindrical face according to the first preferred embodiment is formed, and when laser processing is performed, a via hole with an inner surface that is the inclined surface according to the second preferred embodiment is formed.

(6) Filling of the Paste That Forms the Cavity Into the Via Hole

A paste that forms the cavity is filled into the via hole with the diameter of about 200 μm and then dried.

(7) Formation of the Discharge Auxiliary Electrode

The discharge auxiliary electrode is provided by forming a penetration hole with a diameter of about 100 μm in the center of the paste that forms the cavity by machining or laser processing, and filling the penetration hole with the discharge auxiliary electrode and then drying the resultant. When laser processing is performed, the discharge auxiliary electrode with an outer surface that is the inclined surface according to the third preferred embodiment is formed.

(8) Formation of the Discharge Electrodes

Discharge electrodes to be coupled to outer electrodes are applied by screen printing. The discharge electrodes may be coupled to the outer electrodes directly or with via holes located therebetween, or may be coupled to a circuit pattern or an integrated circuit.

(9) Lamination and Pressure Bonding

The ceramic sheets are laminated and then undergo pressure bonding. Here, the lamination is performed so that the thickness is about 0.3 mm and the discharge auxiliary electrode is located at a center or substantially at a center.

(10) Cutting and Formation of the Outer Electrodes

Similar to an electronic chip component, for example, an LC filter, cutting is performed with a microcutter to provide separate chips. Here, the cutting is performed to provide dimensions of about 1.0 mm×about 0.5 mm, for example. After that, the outer electrodes are formed by applying the electrode paste to chip end surfaces. In forming the outer electrodes, after chip firing, the electrode paste may be applied to the chip end surfaces and baked.

(11) Firing

Subsequently, firing is performed in an N2 atmosphere. When the electrode material is not oxidized, for example, Ag, an air atmosphere is also allowed. The paste that forms the cavity is removed by fire in the firing and the cavity is formed.

(12) Plating

Similar to a chip type electronic component, for example, an LC filter, electrolytic Ni—Sn plating is performed on the outer electrodes.

(13) Completion

As described above, an ESD protection device is completed. The ceramic material included in the ceramic sheets is not particularly limited to the above-described materials and may be an LTCC material, which is provided by adding glass or the like to $Al_2O_3$, cordierite, murite, foresterite, or CaZrO3, an HTCC material, which is $A_2O_3$, cordierite, murite, or foresterite, for example, a ferrite material, a dielectric material, or a resin material.

Although the material of the discharge electrodes may be Ag, Pd, Pt, Al, Ni, W, or a combination thereof instead of Cu, Cu or Ag is desirable because of its high thermal conductivity.

The discharge auxiliary electrode may be a discrete particle of a conductor or a semiconductor, or a combination thereof or may be a combination of conductor, semiconductor, and insulator particles. A particle of a conductor may include a core-shell structure or a noncore-shell structure ormay be a combination of both of the structures. Adding a particle with a core-shell structure that includes a shell of an insulator with a thickness of nanometers is able to maintain dielectric strength without lowering ESD responsiveness. Further, dielectric strength is able to be increased by including glass or resin between particles, which defines and functions as a coupler.

Although the cavity is formed by screen printing with a resin paste, a resin sheet may be included in the formation.

SECOND IMPLEMENTATION EXAMPLE

Described below is an implementation example of a manufacturing method according to the fourth preferred embodiment.

First, operations (1) and (2) of the first implementation example are performed.

(3) Preparation of the Discharge Auxiliary Electrode

A mixture paste is provided by compounding SiC with an average particle diameter of about 0.5 μm, which is a carbide-based ceramic that causes gas during firing, and core/shell powder of $Cu/Al_2O_3$ with an average particle diameter of about 2 μm at a ratio of about 80/20 vol %, adding binder resin and a solvent, and agitating and mixing the resultant with three rolls. In the mixture paste, the binder resin, which includes ethyl cellulose, for example, and the solvent is about 20 wt % while the core/shell Cu powder and the SiC powder is about 80 wt %. Another carbide-based ceramic that causes gas during firing may be included instead of SiC. Examples thereof include TiC, ZrC, and NbC.

After that, operations (4) to (10) of the first implementation example are performed.

(11) Firing

Subsequently, firing is performed in an N2 atmosphere. The atmosphere in a firing furnace may be controlled by charging H2O and H2 in the firing. The paste that forms the cavity is removed by fire at an early stage of the firing and the cavity is defined, and sintering of the ceramic is completed. At this time, in a state where the cavity is sealed, the internal pressure in the cavity is increased by CO gas caused through the decomposition of the carbide-based ceramic in the discharge auxiliary electrode and the cavity is shaped as a dome.

After that, the ESD protection device is completed by performing (12) of the first implementation example.

EXPERIMENTAL RESULTS

Characteristics results on implementation examples of preferred embodiments of the present invention and comparative examples are indicated in Table 1. Discharge responsiveness to ESD is evaluated. The responsiveness to ESD is checked through a static electricity discharge immunity test stipulated in IEC61000-4-2, which is a standard of IEC.

TABLE 1

| NO. | INNER SURFACE SHAPE OF BASE BODY (VIA HOLE) | OUTER SURFACE SHAPE OF DISCHARGE AUXILIARY ELECTRODE | L1 [μm] | RELATION BETWEEN L1 AND L3 | DISCHARGE START VOLTAGE | RESISTANCE TO CONTINUOUS APPLICATION OF ESD 10 TIMES | 100 TIMES | 200 TIMES | 300 TIMES |
|---|---|---|---|---|---|---|---|---|---|
| 1 | VERTICAL SURFACE | NONE | — | — | 8 kV | ⊚ | X | X | X |

TABLE 1-continued

| NO. | INNER SURFACE SHAPE OF BASE BODY (VIA HOLE) | OUTER SURFACE SHAPE OF DISCHARGE AUXILIARY ELECTRODE | L1 [μm] | RELATION BETWEEN L1 AND L3 | DISCHARGE START VOLTAGE | RESISTANCE TO CONTINUOUS APPLICATION OF ESD | | | |
|---|---|---|---|---|---|---|---|---|---|
| | | | | | | 10 TIMES | 100 TIMES | 200 TIMES | 300 TIMES |
| 2 | NONE | VERTICAL SURFACE | — | — | 6 kV | Δ | Δ | X | X |
| 3 | VERTICAL SURFACE | VERTICAL SURFACE | 50 | L1 = L3 | 4 kV | ⊚ | ⊚ | ○ | ○ |
| 4 | TAPERED SURFACE | TAPERED SURFACE | 50 | L1 = L3 | 4 kV | ⊚ | ⊚ | ○ | ○ |
| 5 | INVERSELY TAPERED SURFACE | TAPERED SURFACE | 25 | L1 < L3 | 2 kV | ⊚ | ⊚ | ○ | ○ |
| 6 | INVERSELY TAPERED SURFACE | INVERSELY TAPERED SURFACE | 50 | L1 = L3 | 4 kV | ⊚ | ⊚ | ○ | ○ |
| 7 | TAPERED SURFACE | INVERSELY TAPERED SURFACE | 75 | L1 > L3 | 5 kV | ⊚ | ⊚ | ○ | ○ |
| 8 | VERTICAL SURFACE | TAPERED SURFACE | 50 | L1 < L3 | 3 kV | ⊚ | ⊚ | ⊚ | ○ |
| 9 | VERTICAL SURFACE | INVERSELY TAPERED SURFACE | 75 | L1 > L3 | 5 kV | ⊚ | ⊚ | ⊚ | ○ |
| 10 | TAPERED SURFACE | VERTICAL SURFACE | 50 | L1 > L3 | 4.5 kV | ⊚ | ○ | ○ | ○ |
| 11 | INVERSELY TAPERED SURFACE | VERTICAL SURFACE | 25 | L1 < L3 | 2 kV | ⊚ | ○ | ○ | ○ |
| 12 | DOMICAL SURFACE | VERTICAL SURFACE | 50 | L1 < L3 | 3 kV | ⊚ | ⊚ | ⊚ | ⊚ |

As indicated in Table 1, 2 kV, 3 kV, 4 kV, 5 kV, 6 kV, and 8 kV are applied by contact discharge and the ESD application voltages at which discharge is started are referred to as discharge start voltages. Contact discharge of 8 kV is performed 10 times, 100 times, 200 times, and 300 times to measure insulation resistance of the ESD protection device after the application and when logIR≥about 8Ω, it is determined as being excellent (⊙), when about 8Ω>logIR≥about 6Ω, it is determined as being good (○), when about 6Ω>logIR≥about 4Ω, it is determined as being fair (Δ), and when logIR<about 4Ω, it is determined as being poor (×).

Figure 6A:
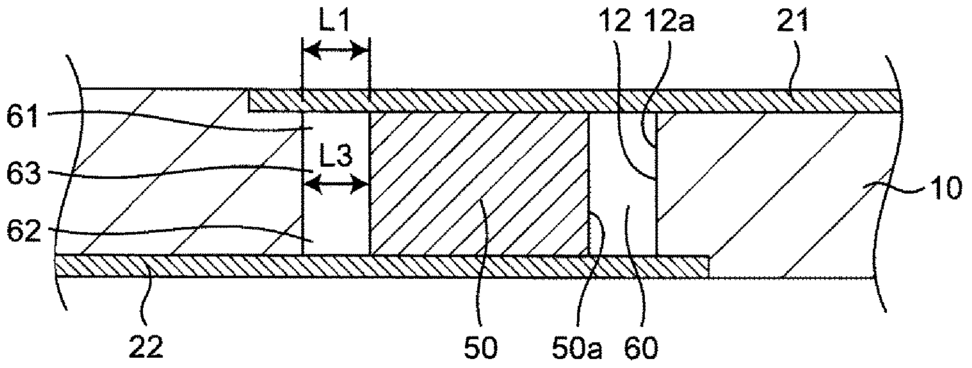
FIG. 6A is a cross-sectional view that illustrates an implementation example of a preferred embodiment of the present invention.
Figure 6B:
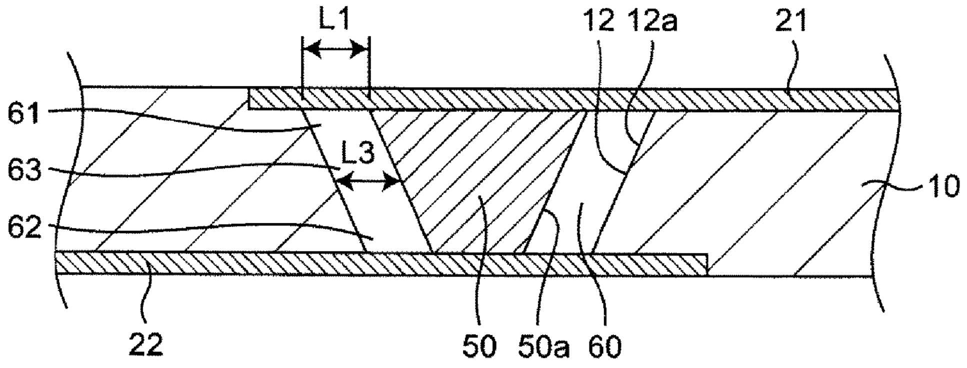
FIG. 6B is a cross-sectional view that illustrates an implementation example of a preferred embodiment of the present invention.
Figure 6C:
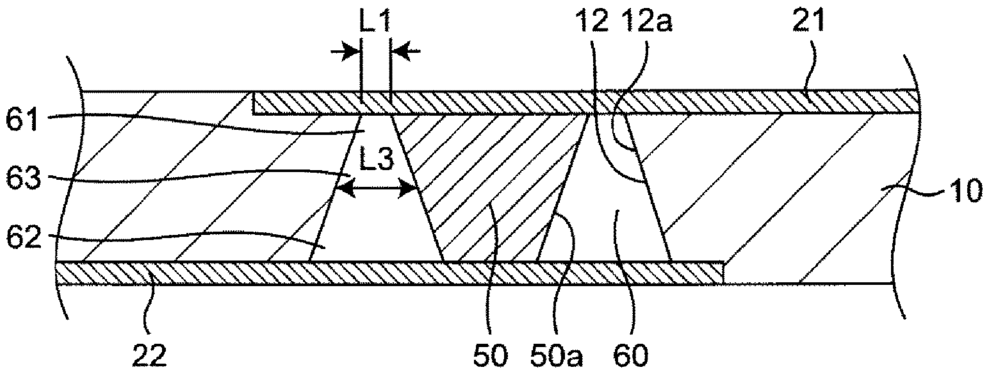
FIG. 6C is a cross-sectional view that illustrates an implementation example of a preferred embodiment of the present invention.
Figure 6D:
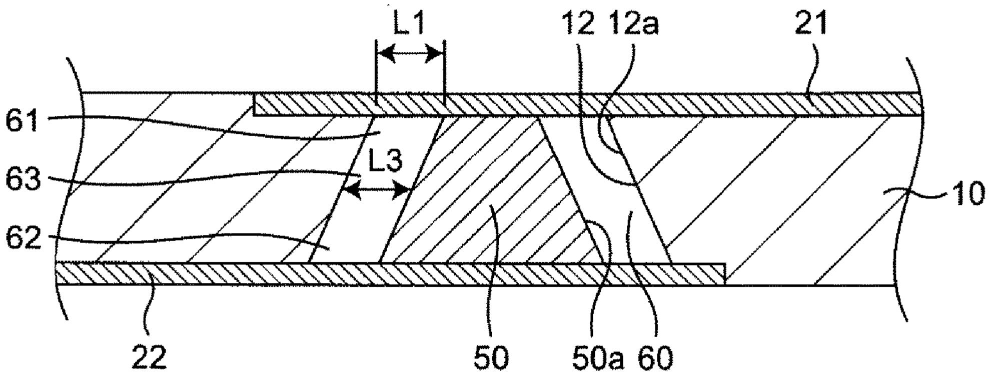
FIG. 6D is a cross-sectional view that illustrates an implementation example of a preferred embodiment of the present invention.
Figure 6E:
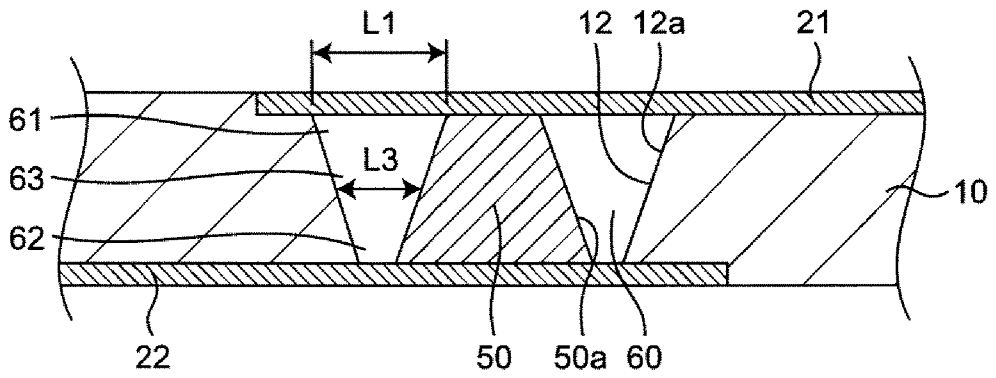
FIG. 6E is a cross-sectional view that illustrates an implementation example of a preferred embodiment of the present invention.
Figure 6F:
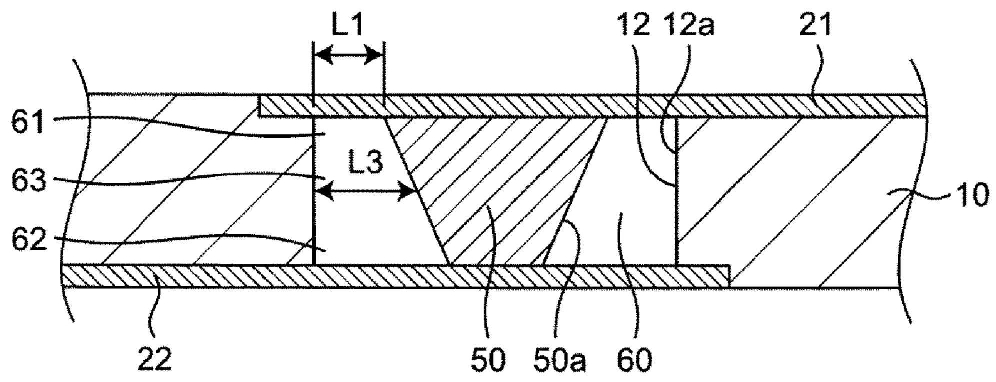
FIG. 6F is a cross-sectional view that illustrates an implementation example of a preferred embodiment of the present invention.
Figure 6G:
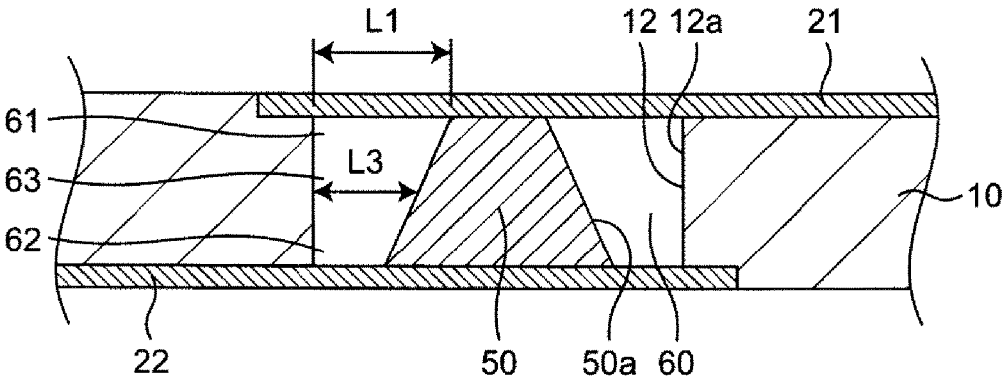
FIG. 6G is a cross-sectional view that illustrates an implementation example of a preferred embodiment of the present invention.
Figure 6H:
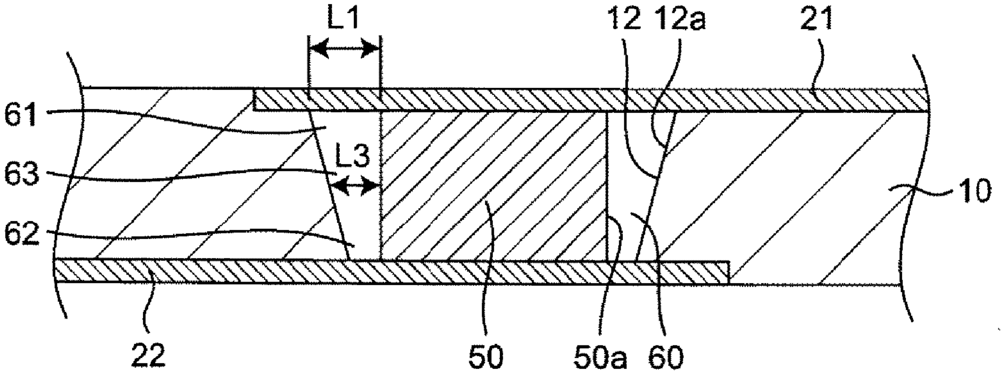
FIG. 6H is a cross-sectional view that illustrates an implementation example of a preferred embodiment of the present invention.
Figure 6I:
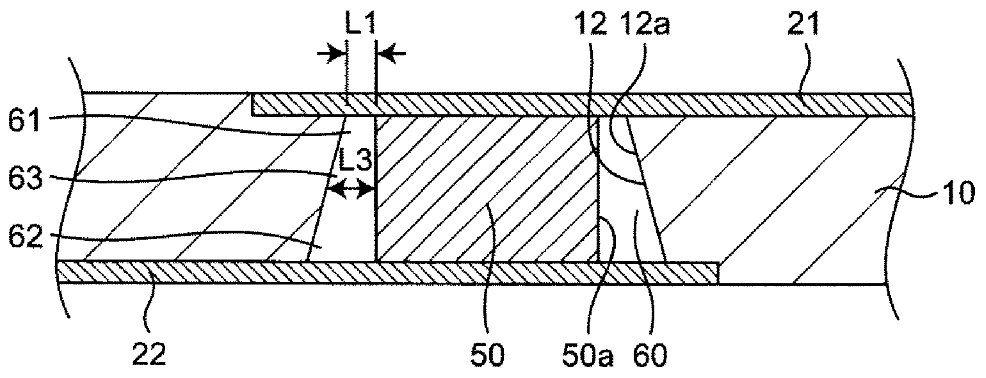
FIG. 6I is a cross-sectional view that illustrates an implementation example of a preferred embodiment of the present invention.
Figure 6J:
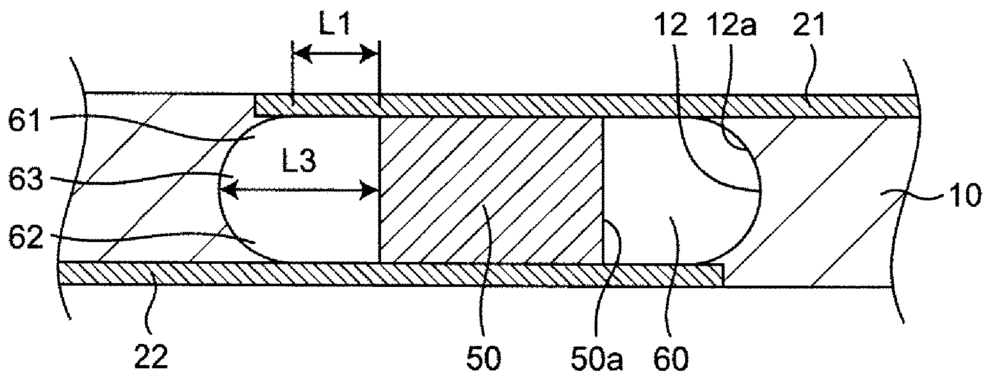
FIG. 6J is a cross-sectional view that illustrates an implementation example of a preferred embodiment of the present invention.

Nos. 1 and 2 indicate comparative examples and Nos. 3 to 12 indicate preferred embodiments of the present invention. Nos. 3 to 12 correspond to FIGS. 6A to 6J. Reference signs in FIGS. 6A to 6J correspond to reference signs in the second preferred embodiment (FIG. 3). FIG. 6A corresponds to the first preferred embodiment, FIG. 6F corresponds to the third preferred embodiment, FIG. 6I corresponds to the second preferred embodiment, and FIG. 6J corresponds to the fourth preferred embodiment.

Regarding the inner surface shape of the base body or the outer surface shape of the discharge auxiliary electrode in Table 1, a vertical surface denotes a surface along the lamination direction, a tapered surface denotes an inclined surface that becomes narrower from the first discharge electrode toward the second discharge electrode, an inversely tapered surface denotes an inclined surface that becomes wider from the first discharge electrode toward the second discharge electrode, and a domical surface denotes a depressed arc-shaped surface.

As demonstrated in Table 1, as the first length L1 decreases, the ESD responsiveness rises and the discharge start voltage decreases. When the first length L1 is shorter than the middle-portion length L3, electric field concentration on the side of the first discharge electrode occurs, the ESD responsiveness rises, and the discharge start voltage decreases. As the volume of the cavity increases, resistance to continuous application of ESD increases.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electro-static discharge (ESD) protection device comprising:

a base body;

a first discharge electrode and a second discharge electrode that are provided in the base body and face each other in a lamination direction; and a discharge auxiliary electrode that is provided between the first discharge electrode and the second discharge electrode and electrically couples the first discharge electrode and the second discharge electrode; wherein the base body includes a cavity provided around at least a portion of an outer surface of the discharge auxiliary electrode, the cavity exposing the first discharge electrode, the second discharge electrode, and a region that is included in the outer surface of the discharge auxiliary electrode and is present between the first discharge electrode and the second discharge electrode.

2. The ESD protection device according to claim 1, wherein a size of the cavity on a side of the first discharge electrode is smaller than a size of the cavity in a middle portion between the first discharge electrode and the second discharge electrode.

3. The ESD protection device according to claim 2, wherein in a cross section along the lamination direction, a length of the cavity in a direction orthogonal or substantially orthogonal to the lamination direction in a position of the first discharge electrode is shorter than a length of the cavity in a direction orthogonal or substantially orthogonal to the lamination direction in a middle position between the first discharge electrode and the second discharge electrode.

4. The ESD protection device according to claim 2, wherein in a cross section along the lamination direction, an inner surface of the base body defining the cavity includes an inclined shape that becomes wider from the first discharge electrode toward the second discharge electrode and the cavity increases in size from the first discharge electrode toward the second discharge electrode.

5. The ESD protection device according to claim 2, wherein in a cross section along the lamination direction, an outer surface of the discharge auxiliary electrode defining the cavity includes an inclined shape that becomes narrower from the first discharge electrode toward the second discharge electrode and the cavity increases in size from the first discharge electrode toward the second discharge electrode.

6. The ESD protection device according to claim 2, wherein in a cross section along the lamination direction, an inner surface of the base body defining the cavity includes a depressed shape that becomes wider from each of the first discharge electrode and the second discharge electrode toward a middle portion between the first discharge electrode and the second discharge electrode and the cavity increases in size from each of the first discharge electrode and the second discharge electrode toward the middle portion between the first discharge electrode and the second discharge electrode.

7. The ESD protection device according to claim 1, wherein the cavity is provided all around the outer surface of the discharge auxiliary electrode.

8. The ESD protection device according to claim 1, wherein the cavity includes a circular or a substantially circular shape when viewed in the lamination direction.

9. The ESD protection device according to claim 1, wherein the base body includes a rectangular parallelepiped or a substantially rectangular parallelepiped shape.

10. The ESD protection device according to claim 1, wherein the base body includes a plurality of laminated ceramic layers.

11. The ESD protection device according to claim 1, further comprising a first outer electrode and a second outer electrode that are provided on at least one outer surface of the base body.

12. The ESD protection device according to claim 11, wherein the first discharge electrode is electrically coupled to the first outer electrode and the second discharge electrode is electrically coupled to the second outer electrode.

13. The ESD protection device according to claim 1, wherein a first end portion of the first discharge electrode in a longitudinal direction is exposed at a first surface of the base body and a second end portion of the first discharge electrode in the longitudinal direction is located within the base body;

a first end portion of the second discharge electrode in the longitudinal direction is exposed at a second surface of the base body and a second end portion of the second discharge electrode in the longitudinal direction is located within the base body; and the first surface of the base body is a different surface from the second surface of the base body.

14. The ESD protection device according to claim 1, wherein the discharge auxiliary electrode includes a mixture of a conducting material and an insulating material.

15. An electronic apparatus, comprising:

a first terminal coupled to a voltage or signal source;

a second terminal coupled to ground; and the ESD protection device according to claim 1, wherein the EDS protection device is coupled between the first terminal and the second terminal.

16. The ESD protection device according to claim 1, wherein a size of the cavity on a side of the second discharge electrode is larger than a size of the cavity in a middle portion between the first discharge electrode and the second discharge electrode.

17. The ESD protection device according to claim 1, wherein a size of the cavity on a side of the second discharge electrode is smaller than a size of the cavity in a middle portion between the first discharge electrode and the second discharge electrode.

* * * * *